Dec. 26, 1950        E. A. DINGLEY        2,535,727
SHOVEL LOADER
Filed June 27, 1945
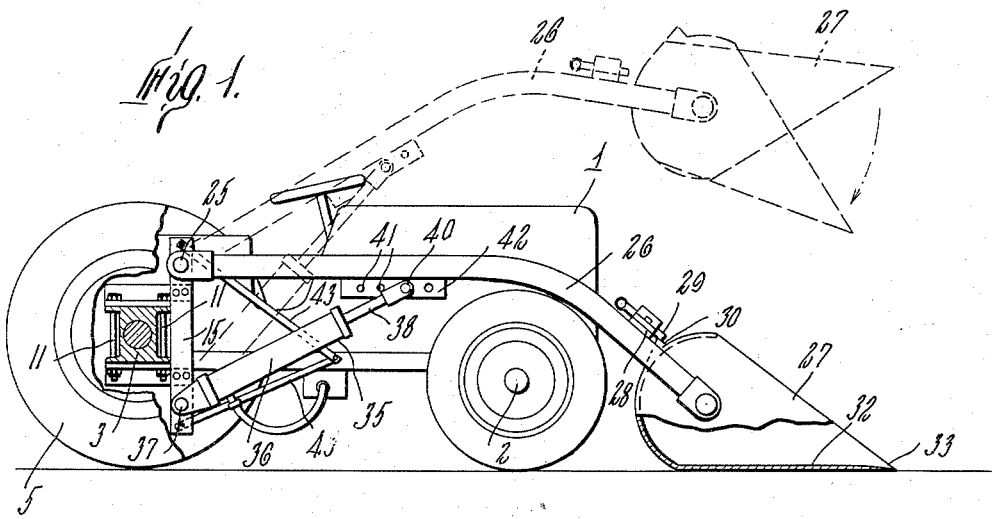
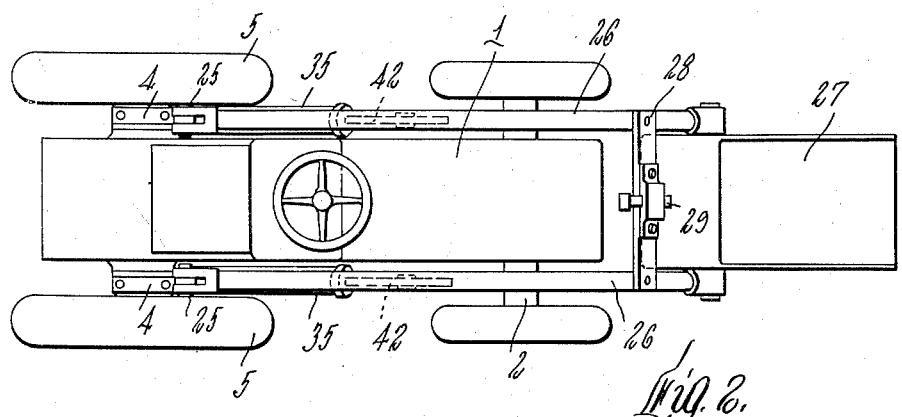
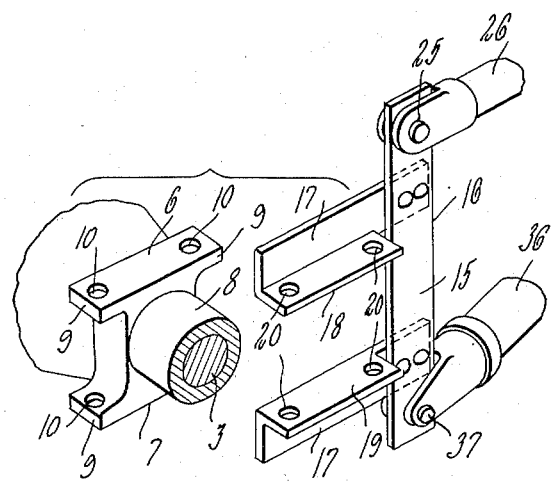
Inventor
Elmer A. Dingley Patented Dec. 26, 1950

2,535,727

UNITED STATES PATENT OFFICE 2,535,727

SHOVEL LOADER

Elmer A. Dingley, Natick, Mass.

Application June 27, 1945, Serial No. 601,863

5 Claims. (Cl. 214—140)

This invention relates to loaders of that type which are adapted to be attached to tractors, such a loader being provided with a scoop adapted to be pushed forward by the tractor to fill, and which may then be lifted, and dumped while in elevated position.

One object of this invention is to provide a simple and cheap loader which can be readily attached to or detached from the tractor.

A further object is to provide a loader which, particularly when the scoop is lowered, adds little weight at the forward part of the tractor, the forward wheels of which, when the loader is in use, commonly resting upon relatively soft or muddy ground.

A further object of the invention is to provide a construction which prevents the weight of the bucket, when being lifted, from raising the rear tractor wheels from the ground.

A further object of the invention is to provide a construction wherein the resistance to forward filling motion of the scoop is transmitted into pressure of the rear wheel against the ground, thus to increase the traction effect on wheels spaced well back of the position of pressure and where the ground is likely to be firmer than where the scoop has more recently been operating.

A further object is to provide a loader, which when in loading position, lies entirely below the top of the tractor. This permits the loader to be run under a low barn or other structure as far as the tractor itself can go.

For a complete understanding of this invention, reference may be had to the accompanying drawings in which Figure 1 is a side elevation of a tractor showing a loader constructed in accordance with this invention carried thereby.

Figure 2 is a top plan view of the same.

Figure 3 is a fragmentary exploded perspective view showing the manner of attaching the loader to the tractor.

Referring to the drawings, at 1 is indicated a tractor of conventional type having a forward axle 2 and a rear axle 3. The rear axle is journaled in a pair of spaced axle boxes 4 inwardly of supporting rear wheels 5. As shown best in Figure 3, each of the axle boxes 3 has upper and lower flat face portions 6 and 7 extended forwardly and backwardly beyond a central portion 8 to form ears 9. These ears are provided with vertically alined holes 10 through which a pair of bolts 11 for each axle box may be passed as shown in Figure 1. These bolts serve to attach to the axle box, a bracket 15, comprising a forward upright bar 16 to which are secured upper and lower angle members 17, these angle members having horizontal flanges 18 and 19 perforated at 20 for the reception of the bolts 11. To the upper end of each bar 16, above the axle, is pivotally secured, as on the pivot 25, the rear end of an arm 26. This arm 26 extends forwardly, as shown in Figure 1, and is curved downwardly forwardly to form a pivotal support for a scoop 27. When the scoop is in normal lowered position, the arms extend substantially horizontally from the bracket forwardly to about the front axle below the top of the tractor. This brings the entire mechanism below the top of the tractor except when the scoop is lifted. The two arms 26 are shown as secured together forwardly of the tractor and back of the scoop 27 as by a bar 28 which carries a spring latch 29 constructed to engage a mating portion 30 on the bucket in order to releasably hold the bucket in loading angular position shown in full lines in Figure 1 and with its bottom face 32 resting upon the ground, its open end 33 forwardly facing. Any suitable means such as a cable or cord (not shown) may be secured to the latch 29 and extended to a convenient position for the operator of the tractor by which the latch may be retracted in the dotted line position of Figure 1, allowing the bucket to tilt by gravity and dump its contents.

Means are provided by which the scoop can be raised when filled and then dumped into any desired container. In order to so raise the bucket, a pair of jacks 35 has been shown. Each of these jacks comprises a hydraulic cylinder 36 pivoted at its rear end to the lower extremity of the bar 16 as at 37, below the rear axle. A piston rod 38 slidable within each cylinder 36 is pivotally secured at 40 in any one of a series of holes 41 in a bracket 42 secured to and depending from the corresponding arm 26.

In some cases it may be found desirable to connect the upper and lower ends of the bars 16 to the tractor frame, as by tie rods 43, as shown in Figure 1 to take rocking stresses exerted on the axle boxes 4 by rearward thrust of the arms 26 as the scoop is driven forwardly and by the thrust of the jacks as the scoop is being lifted. Since the lifting effort is exerted on the tractor adjacent to the rear axle, it has little tendency to tip the tractor forwardly, driving the front wheels into soft ground and lifting the rear wheels off the ground; a difficulty often experienced where the weight is concentrated further forwardly, and which has required the use of counter weights at the rear of the tractor.

It will be noted that the scoop and its mounting, when the scoop is in its lowered position, is entirely below the top of the tractor so that it can be run under a barn or other low building anywhere that the tractor can go. It will also be noted that the rearward pressure of the material being scooped up in the scoop 27 as it is pushed forwardly, is transmitted to the rear portion of the tractor and above the rear axle, this resulting in a component of force tending to increase the pressure exerted by the rear tractor wheels against the ground and thus increase the effective tractive effort of the tractor. Ordinarily these rear wheels will rest upon more substantial ground than the forward wheels, which rest on ground more recently uncovered by the action of the loader, and which may be moist and consequently soft and yieldable. This construction, therefore, tends to prevent the tractor from becoming mired in fresh, soft ground which might be the case were weight transmitted directly to the forward portion of the tractor and be taken by the front wheels.

It will also be noted that the lifting mechanism comprising the jacks 35 is entirely beneath the arms 26 where it is out of the way and because of its angular relation to the arms 26, only a small motion of the jack is necessary in order to produce a considerable lifting of the scoop.

It will also be noted that the scoop and its mounting can be readily attached to the standard tractor without requiring the use of any more or less permanent securing structure, so that when the loader has been removed the tractor is free from parts which might be in the way for attachment of other mechanisms thereto.

From the foregoing description of an embodiment of this invention it should be evident to those skilled in the art that various changes and modifications might be made without departing from the spirit or scope of this invention.

I claim:

1. In combination with a tractor having front and rear axles and a rear axle box for said rear axle on each side, a bracket secured to each axle box and extending above and below said axle, an arm pivoted at its rear end to the upper portion of said bracket and extending forwardly, a pivoted scoop carried by the forward ends of said arms and when in lowered position lying forwardly of said front axle, and with said arms back of said forward axle substantially horizontal when said scoop is in normal lowered position, a bar joining said arms back of said scoop, a latch carried by said bar normally holding said scoop in scooping angular position, and a hydraulic jack having one end pivoted to the lower portion of each bracket and the other end pivoted to the adjacent arm forwardly of its pivot.

2. A loading attachment for a tractor, said attachment comprising a bracket for each side of said tractor and having upper and lower extensions and adapted to be attached to the tractor between said extensions, an arm pivoted to each of said brackets at said upper extension, a scoop supported between the forward ends of said arms, said arms extending forwardly substantially horizontally from said brackets and their forward ends being downwardly turned to said scoop when said scoop is in normal lowered position, and a jack pivoted at one end to the lower extension of each bracket and at its other end to one of said arms.

3. A loading attachment for a tractor, said attachment comprising a pair of brackets having upper and lower extensions and adapted to be attached to the tractor, an arm pivoted to each of said brackets at said upper extensions, a scoop pivotally supported between the forward ends of said arms, said arms extending forwardly substantially horizontally from said bracket when said scoop is in normal position, said forward ends being downwardly turned, a jack pivoted at one end to the lower extension of each bracket and at its other end to one of said arms, a bar joining the forward ends of said arms adjacent to said scoop, and a latch carried by said bar and normally engaging said scoop to retain said scoop in loading angular position.

4. A loading attachment for a tractor, said attachment comprising a pair of brackets having upper and lower extensions and adapted to be attached to the tractor, an arm pivoted to each of said brackets at said upper extensions, a scoop pivotally supported between the forward ends of said arms, said arms extending forwardly substantially horizontally from said brackets when said scoop is in normal position, said forward ends being downwardly turned, and a jack pivoted at one end to the lower extension of each bracket and at its other end to one of said arms.

5. In combination with a tractor having front and rear axles and a rear axle box for said rear axle on each side, a bracket secured to each axle box and extending above and below said axle, an arm pivoted at its rear end to the upper portion of said bracket and extending forwardly, a pivoted scoop carried by the forward ends of said arms and when in lowered position lying forwardly of said front axle and with said arms back of said forward axle substantially horizontal when said scoop is in normal lowered position, and a hydraulic jack having one end pivoted to the lower portion of each bracket and the other end pivoted to the adjacent arm forwardly of its pivot.

ELMER A. DINGLEY.

REFERENCES CITED

The following references are of record in the file of this patent:

UNITED STATES PATENTS

| Number | Name | Date |
|---|---|---|
| 2,001,803 | Stephens | May 21, 1935 |
| 2,019,938 | Stephens | Nov. 5, 1935 |
| 2,268,689 | Andrus | Jan. 6, 1942 |
| 2,304,443 | Butler | Dec. 8, 1942 |
| 2,319,921 | Dooley et al. | May 25, 1943 |
| 2,341,776 | Heath | Feb. 15, 1944 |
| 2,363,986 | Mott | Nov. 28, 1944 |
| 2,389,029 | Crabtree | Nov. 13, 1945 |
| 2,395,622 | Galbreath | Feb. 26, 1946 |